Aug. 7, 1945.    S. I. IVERSON    2,381,498

HAND WHEEL FOR LAWN HOSE COUPLINGS

Filed Sept. 13, 1943

Sigmund I. Iverson
INVENTOR.

BY
Victor J. Evans & Co.
ATTORNEYS

Patented Aug. 7, 1945

2,381,498

UNITED STATES PATENT OFFICE 2,381,498

HANDWHEEL FOR LAWN HOSE COUPLINGS

Sigmund I. Iverson, Minneapolis, Minn.

Application September 13, 1943, Serial No. 502,223

1 Claim. (Cl. 285—75)

This invention relates to hand gripping wheels, and its general object is to provide a device of that character which is primarily designed to be attached to the swiveled coupling collar of a lawn hose or the like, in order to facilitate applying and removing the collar relative to a faucet or a companion coupling member of a hose section, the device including an annular body that can be readily gripped and means for detachably securing the body to the hose against casual removal or displacement.

A further object is to provide a hand wheel that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
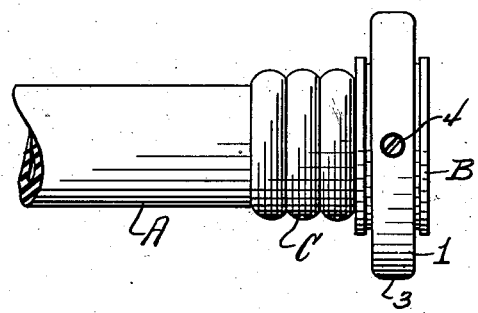
Figure 1 is a side elevation, illustrating my device fixed to the coupling collar of a lawn hose.

Referring to the drawing in detail, the letter A indicates a lawn hose having a conventional coupling collar B swiveled on the fastening element C, in the usual manner, the collar being adapted for coupling the hose to a faucet or a companion or male coupling member of another hose section, it being well known that considerable difficulty is experienced in coupling and uncoupling the collar, due to the limited gripping area thereof, but by the use of my device such can be accomplished in any easy and expeditious manner.

The device includes a ring like or annular body 1 having an inner periphery 2 that is transversely flat throughout the width thereof, and the outer periphery 3 may be transversely rounded, but is shown as being flat, with transversely rounded edges. The body is relatively thick, for the obvious purpose to extend a considerable distance outwardly and radially of the collar B when attached thereto, so as to provide an ample portion to be gripped, and the outer periphery may be knurled or otherwise roughened to facilitate gripping the same.

Figure 2:
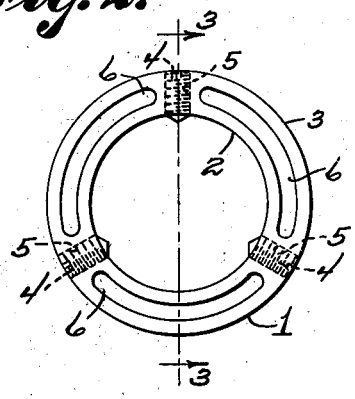
Figure 2 is a front view of the device per se.
Figure 3:
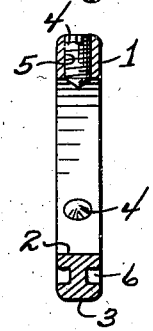
Figure 3 is a sectional view taken approximately on line 3—3 of Figure 2, looking in the direction of the arrows.

In order to secure the body to the collar B I provide set screws 4 which are threaded in bores 5 extending radially through the body in equidistantly spaced relation to each other, the screws having conical inner ends providing points to bite into the collar, and kerfed outer ends for receiving a screw driver or the like, and the opposite sides of the body are formed with circumferentially extending grooves 6 between the bores, as best shown in Figure 2, in order to conserve material and to render the body light in weight.

The inside diameter of the body is of course greater than that of the over-all diameter of the collar and in applying the device to the collar, it is arranged in surrounding relation thereto between the flanges providing the channel, and the set screws are then threaded in biting engagement with the bottom wall of the channel, to fix the body thereto against casual removal or displacement, as will be apparent upon inspection of Figure 1. The screws are of a length to be countersunk in the bores for disposal flush with or below the outer peripheral face of the body, when the device is in use, so as to not interfere with the gripping of said face when applying and removing the collar relative to a male coupling member or faucet.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

. A detachable hand gripping wheel for mounting on the coupling collar of a hose, comprising an annular body having an internal diameter slightly larger than the outer diameter of the coupling collar and having radially disposed bores therethrough and arranged in equidistantly spaced relation to each other, set screws threaded in said bores for securing the body in surrounding relation to the collar, said body being of one piece formation and relatively thick to extend a considerable distance radially of the collar and the outer periphery of the body being of uninterrupted annular contour to provide a convenient hand gripping surface, said outer periphery having transversely rounded outer edges and the inner periphery of the body being transversely flat throughout the width thereof, said screws having conical inner ends and kerfed outer ends, and the opposite sides of the body having circumferentially disposed grooves therein between the bores.

SIGMUND I. IVERSON.